Sept. 4, 1956  W. C. BUESCHER  2,761,331
LOAD OPERATING DEVICE WITH AUTOMATIC DECLUTCHING MECHANISM
Filed May 17, 1952  5 Sheets-Sheet 1

INVENTOR.
WILBERT C. BUESCHER
BY John Flam
ATTORNEY

Sept. 4, 1956  W. C. BUESCHER  2,761,331
LOAD OPERATING DEVICE WITH AUTOMATIC DECLUTCHING MECHANISM
Filed May 17, 1952  5 Sheets-Sheet 2

INVENTOR.
WILBERT C. BUESCHER
BY John Flam
ATTORNEY

Sept. 4, 1956 W. C. BUESCHER 2,761,331
LOAD OPERATING DEVICE WITH AUTOMATIC DECLUTCHING MECHANISM
Filed May 17, 1952 5 Sheets-Sheet 3

INVENTOR.
WILBERT C. BUESCHER
BY
John Flam
ATTORNEY

Sept. 4, 1956     W. C. BUESCHER     2,761,331
LOAD OPERATING DEVICE WITH AUTOMATIC DECLUTCHING MECHANISM
Filed May 17, 1952     5 Sheets-Sheet 4

INVENTOR,
WILBERT C. BUESCHER
BY
John Flam
ATTORNEY

Sept. 4, 1956 W. C. BUESCHER 2,761,331
LOAD OPERATING DEVICE WITH AUTOMATIC DECLUTCHING MECHANISM
Filed May 17, 1952 5 Sheets-Sheet 5

INVENTOR,
WILBERT C. BUESCHER
BY
John Flam
ATTORNEY

United States Patent Office 2,761,331
Patented Sept. 4, 1956

2,761,331

LOAD OPERATING DEVICE WITH AUTOMATIC DECLUTCHING MECHANISM

Wilbert C. Buescher, Alhambra, Calif., assignor to General Controls Co., Glendale, Calif., a corporation of California Application May 17, 1952, Serial No. 288,487

22 Claims. (Cl. 74—625)

This invention relates to a motor actuator for operating a load, such as a valve, or circuit controller, or the like.

Devices of this character are often used for remote control. Thus, a circuit controller at a remote station may be operated to cause the motor to move in either direction. Usually, the torque load imposed on the motor unit is quite substantial. For reasons of economy, it is essential to provide as small a motor as possible to operate the load. Accordingly, a high speed motor of low torque is chosen as a design factor, operating through a reduction gearing having an output connected to the load.

For example, a direct current series wound motor may be effectively employed, operating at about 20,000 revolutions per minute. Such speeds, due to the inertia of the moving parts, introduce the problem of stopping the actuator promptly after completion of a cycle of operation.

It is one of the objects of this invention to make it possible to unclutch the motor unit from the load promptly upon a definite limit to the motion of the load. In this way, the danger of harm to the apparatus is entirely obviated.

In order to accomplish this result, there is provided a friction clutch device through which the load is actuated, and which is automatically disconnected upon completion of a cycle of operation. It is accordingly another object of this invention to control a load driving mechanism in this manner.

It is still another object of this invention to improve, in general, load actuating devices of this character.

It is still another object of this invention not only to unclutch the motor automatically, but also to deenergize it at substantially the same time.

After the load is operated from a remote place by energizing the motor, it is at times desirable to operate the load manually and without energizing the motor. Thus, for example, if the valve closure has been moved to closed position by means of the motor, it may be required to open the valve manually. This requires that the driven clutch member be likewise moved in a direction reverse to that in which it was moved by the driving clutch member.

The clutch device in one form of this invention is so constructed that such reverse movement of the driven clutch member is effective to keep the driving clutch member in driving relation to the driven clutch member, and the role of driving and driven members is interchanged. As the driven clutch member is thus manually urged to open the valve, all of the reduction gearing, as well as the rotor of the motor, are urged to rotate in a reverse direction. The ratio of the transmission being quite high, the torque required to operate this transmission in a reverse direction is correspondingly high. Therefore, it is found that such reverse movement encounters an unusually high resistance. Consequently, the force required manually to move the valve to open position renders such manual "overriding" entirely impractical.

It is accordingly another object of this invention to provide another form in which it is possible to reduce the resistance opposing movement of the load when this movement is produced independently of the motor and its transmission.

In order to accomplish this result, provisions are made to render the drive between the clutch members ineffective when the load is moved independently of the motor in a direction reverse to its actuation by the motor. It is still another object of this invention to provide a simple and effective structure to produce such uncoupling of the clutch members.

This invention possesses many other advantages, and has other objects which may be made more clearly apparent from a consideration of several embodiments of the invention. For this purpose there are shown a few forms in the drawings accompanying and forming part of the present specifications. These forms will now be described in detail, illustrating the general principles of the invention; but it is to be understood that this detailed description is not to be taken in a limiting sense, since the scope of the invention is best defined by the appended claims.

Referring to the drawings.

Figures 1, 8:
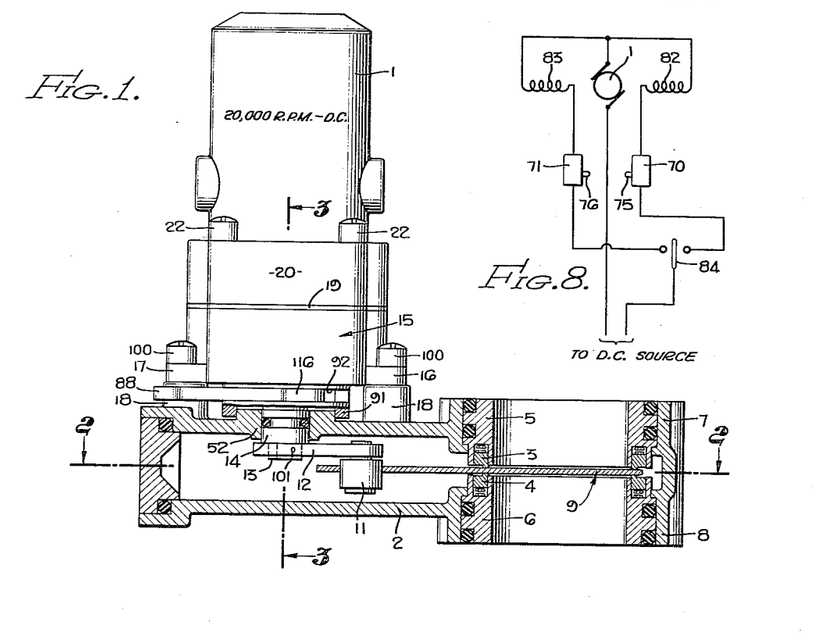
Figure 1 is a view, partly in section, and partly in elevation, of an apparatus incorporating the invention.
Fig. 8 is a wiring diagram of a system in which the apparatus would be employed.
Figure 2:
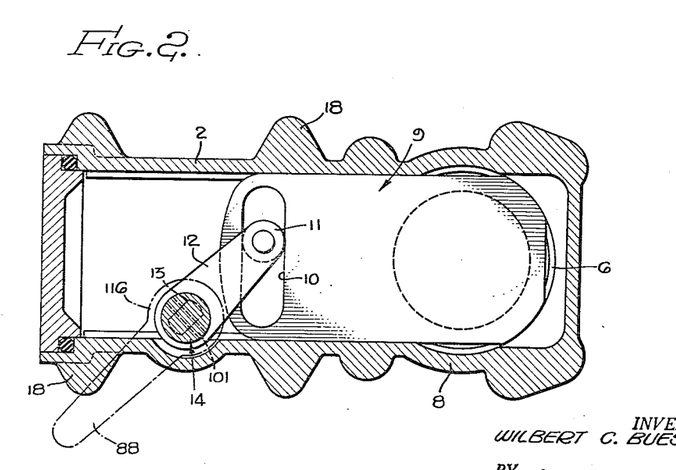
Fig. 2 is a horizontal sectional view, taken along a plane corresponding to line 2—2 of Fig. 1.

In the present instance, a suitable driving source is provided by a small enclosed electric motor (Fig. 1). It is utilized to operate any appropriate load, such as a gate valve structure. In the present example, the gate valve structure includes a casing 2 (Figs. 1 and 2). This casing supports the opposed annular valve seats 3 and 4, axially movable within appropriate grooves in the ends of sleeves 5 and 6 mounted in the cylindrical portions 7 and 8 of the casing 2. A slidable gate valve closure 9 is interposed between the two annular valve seats 3 and 4. As shown most clearly in Fig. 2, this closure member is operated by aid of a transverse slot 10 in which a roller 11 is engaged. This roller 11 is carried at the extremity of a crank 12 mounted on a non-circular lower portion 13 of a drive shaft 14 (see, also, Figs. 3 and 7). Movement of crank 12 through an angle of approximately 90° about the axis of shaft 14 is sufficient to move the closure between open and closed positions. The crank is held to portion 13 by aid of a cross pin 101.

The motor 1 is preferably a series wound direct current motor, having a normal speed in the neighborhood of 20,000 revolutions per minute. Furthermore, this motor 1 is reversible, and is coupled to the shaft 14 through a transmission which greatly reduces the angular speed of this shaft, for example, of the order of one revolution per second. Accordingly, only a very small torque is required by the motor 1 in order to provide a sufficient force for opening and closing the gate valve structure, since the transmission, while reducing the motor speed, acts proportionately to increase the torque at shaft 14. By this means, a relatively small motor can be used, and yet a sufficiently high torque is developed for operating a load.

Mounted above the casing 2 is a housing member or gear casing 15 which accommodates at least a portion of the transmission mechanism between the motor 1 and the shaft 14. This housing has oppositely directed feet 16 and 17 (Fig. 4), serving to provide attachment means to the bosses 18 integrally formed on the upper wall of the valve casing 2. Cap screws 100 pass through these feet to effect this attachment.

Figure 9:
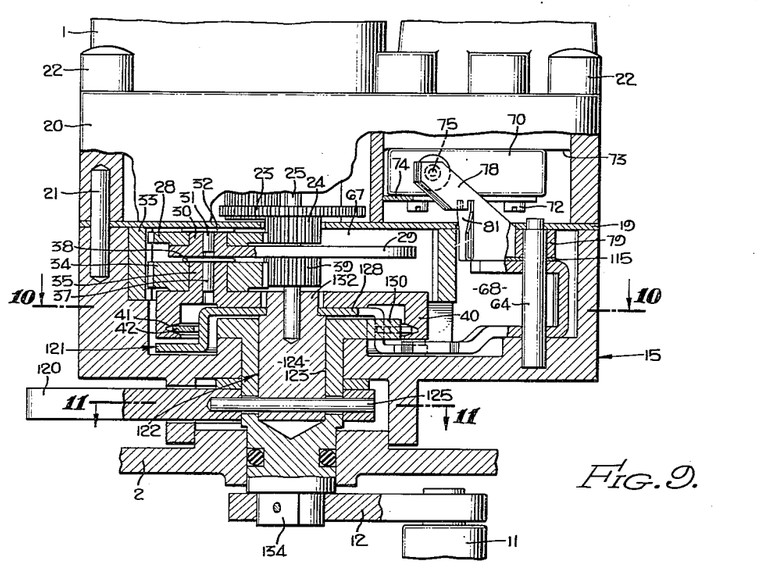
Fig. 9 is a vertical sectional view similar to Fig. 3, and illustrating another embodiment of the invention.

The housing 15 has a vertical wall which is open at the top of the housing, and this opening is closed by a removable horizontal wall 19 above which the base 20 of the motor 1 is disposed. A plurality of dowel pins 21 (Figs. 3 and 9) ensure accurate registry of the casing 15 with the motor base portion 20. Screws 22 serve to hold the base portion 20 to the casing 15.

Figure 3:
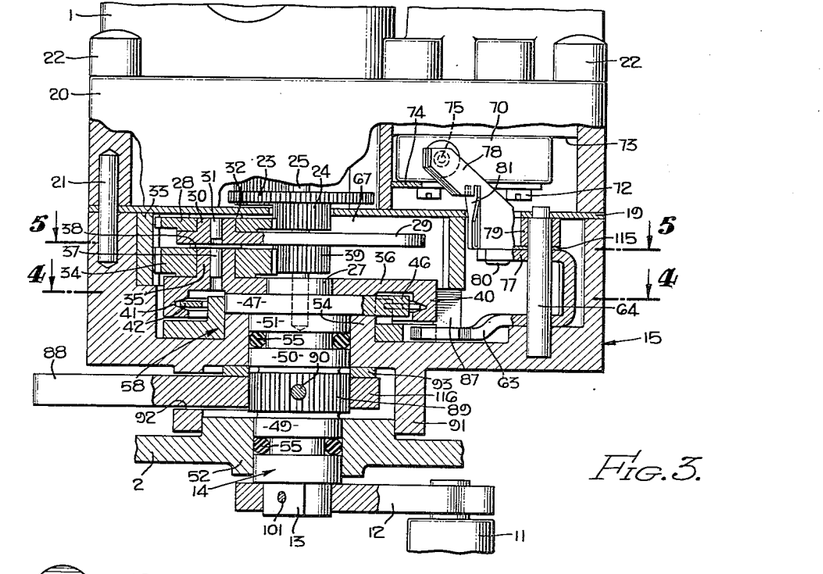
Fig. 3 is an enlarged vertical sectional view, taken along a plane corresponding to line 3—3 of Fig. 1.
Figure 5:
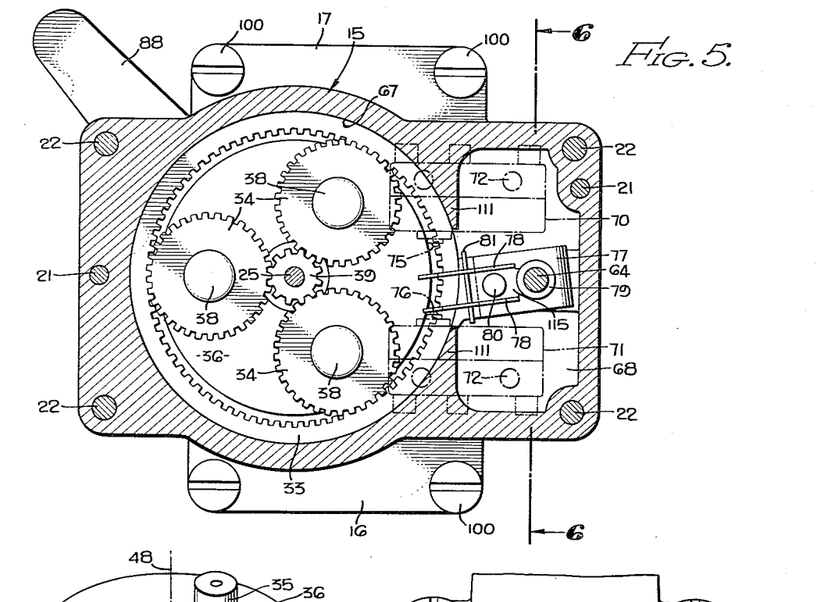

The transmission mechanism interposed between the shaft 14 and the shaft of the motor 1 is shown to best advantage in Figs. 3 and 5.

Figure 4:
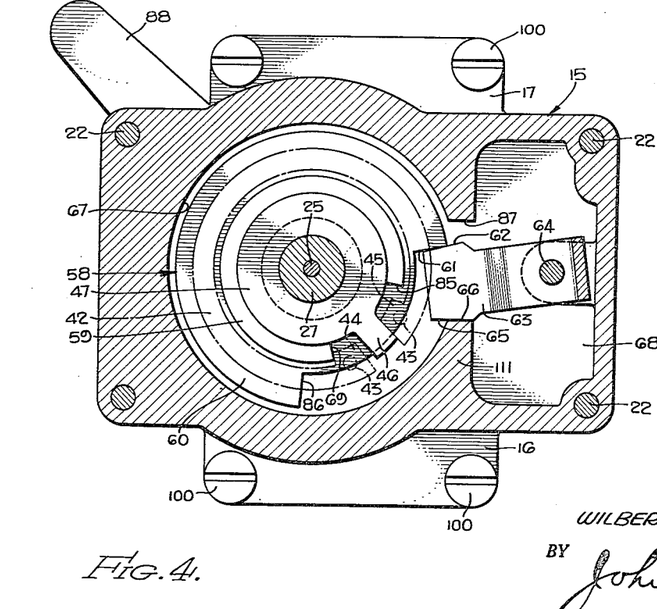
Figs. 4 and 5 are horizontal sectional views, taken along a plane corresponding to lines 4—4 and 5—5 of Fig. 3.

Thus, the motor shaft (not shown) is connected through a train of reduction gearing to drive a spur gear 23. This spur gear is disposed immediately above the cover member 19. It is joined to a pinion 24 which extends through an appropriate aperture in the wall 19 and into a chamber 67 formed in casing 15 by the aid of an interrupted wall 111 (Figs. 3, 4, and 5). Chamber 67 accommodates the major portion of the reduction gearing forming the transmission between motor 1 and load shaft 14.

The gear 23 and its associated pinion 24 are mounted for free rotation on a center pin 25 that is accommodated in a central aperture 26 (Fig. 7) of the upper portion 27 of shaft 14.

Pinion 24 meshes with a plurality of planetary gears 28 rotatably supported on a disc or plate 29 and rotatable about the axis 48 of pin 25. For supporting these gears 28, equiangularly spaced apertured bosses 30 are provided on the upper side of the disc 29. Three such bosses may be used. The gears 28 are journalled over these bosses 39, and are held against removal by the heads 32 of pins 31 engaging the apertures in the bosses 30. The heads 32 are quite closely confined by the lower surface of the wall 19.

The planetary gears 28 are in mesh with the internal teeth of a stationary internal gear 33. This gear has an external periphery in firm contact with the internal cylindrical wall of the chamber 67. As pinion 24 is rotated, the plate or disc 29 is correspondingly rotated at a greatly reduced speed.

Figure 7:
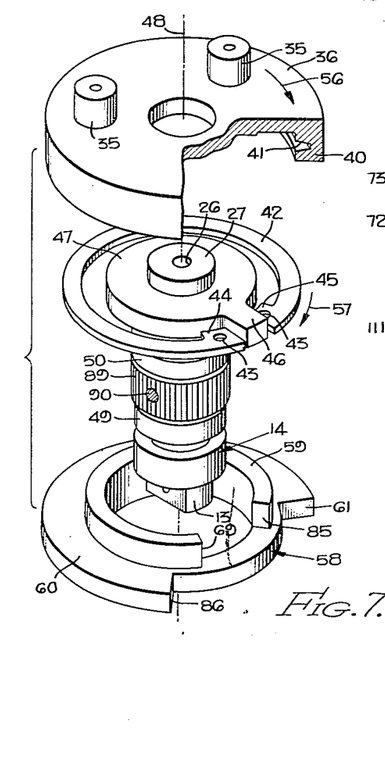
Fig. 7 is a pictorial exploded view illustrating the important operating elements of the apparatus shown in Figs. 1 to 6, inclusive.

A further speed reduction stage is effected by the aid of another set of planetary gears 34 (see, also, Fig. 5) similar to the planetary gears 28. These planetary gears 34 are journalled over the equiangularly spaced apertured boss 35 of a rotary plate 36 (Figs. 5 and 7). As before, headed pins 37 serve to ensure against axial movement of the planetary gears 35. The heads 38 (Fig. 5) of these pins are confined quite closely by the lower surface of the upper rotary plate 29.

Planetary gears 34 mesh not only with the stationary internal gear 33, but also with the pinion 39 joined to the plate 29 and rotatably mounted on the pin 25. Accordingly, the plate 36 is given a rotary motion at a rate corresponding to the reduction effected by this planetary gearing.

Plate 36 has a flange 40 which defines one clutch member of the clutch device incorporated in the transmission mechanism formed by the various gears hereinabove refered to. This plate 36 is freely rotatable about the upper end 27 of the shaft 14.

The flange 40, as shown most clearly in Figs. 3 and 7, is provided with an internal annular groove 41 that tapers toward the external periphery of the plate 36. The other clutch member is in frictional engagement with the sides of this annular groove 41, and is in the form of an expanding interrupted spring ring 42. This spring ring 42 is shown in phantom lines in Fig. 4. The outer edge of this spring ring 42 is wedged into the annular groove 41 by the inherent resilience of the ring 42. It may be contracted for assembly or removal with respect to the groove 41 by the aid of the usual form of tool cooperating with the apertures 43 disposed in the end ears 44 and 45 of the ring 42.

These ears or ends 44 and 45 are angularly spaced sufficiently for the accommodation, with some clearance, of the radial projection 46 formed on a load actuator member 47. This load actuator member 47, in this instance, is shown as integral with the shaft 14. Accordingly, movement of the driven clutch member 42 engages one or the other side of projection 46, and causes corresponding angular movement of the shaft 14. It is assumed, for the position indicated in Figs. 4 and 7, that the actuator 47 is moved in a clockwise direction about the axis 48 of the actuator shaft 14.

The actuator shaft 14 has spaced collars 49, 50, and 51. Collar 49 and the lower end of shaft 14 are rotatably received in the hub 52 of the casing 2. Collars 50 and 51 are similarly journalled in the hub 54 formed on the bottom wall of the casing 15. Sealing rings, such as the rubber O-ring 55, are inserted between the collars 50 and 51, and between the lower portion of shaft 14 and collar 49.

Arrows 56 and 57 of Fig. 7 indicate that the motor 1 continues to rotate in a clockwise direction and the end 45 of ring 42 engages one side of the projection 46. The actuator 47 is correspondingly moved angularly about the axis 48. This drive is effective, since the expanded ring 42 is in tight frictional contact with the annular groove 41 of clutch member 36.

A limit is imposed upon the clockwise movement of the actuator 47, after which the clutch ring 42 is disengaged sufficiently to permit slipping between the ring 42 and the groove 41. This limit in a clockwise rotation corresponds to the closed position of the valve closure 9, as indicated in Fig. 2.

To provide this limit to rotation, a stop ring structure is utilized including a base 58 (Figs. 3 and 7). This base 58 is freely rotatably mounted on the exterior of the hub 54 in chamber 67. It is provided with an upper interrupted flange 59, having end surfaces 69 and 85. The ring has a lower interrupted flange 60, having end surfaces 86 and 61. One end surface 69 of the upper flange 59 contacts the inner surface of the ear 44. It thus serves as a force transmitting means engaging the trailing end of the ring 42. The other end surface 85 of the upper flange is angularly spaced from the ear 45 (Fig. 4). The end surfaces 86, 61 of the lower flange 60 serve the important function of providing limits or stops to the angular movement of actuator 47 in either direction of rotation. Thus, the total movement in either direction is limited to about 90°.

As the actuator 47 moves in a clockwise direction, the ear 44, engaging end surface 69 (Fig. 4), urges the ring 58 in the same direction. Ultimately, the end 61 of the lower flange 60 contacts one side 62 of an abutment 63 (Fig. 4). This abutment member 63 forms the lower leg of a U-shaped structure, having an upper leg 77. This structure is pivotally mounted upon a pin 64 supported between the lower wall of the casing 15 and the upper wall 19. This pin thus extends vertically across the chamber 68 in casing 15, this chamber being separated from the gear chamber 67 by wall 111.

The abutment member 63 extends through an opening in wall 111, defined by the surfaces 66 and 87. These surfaces form stops or limits to the movement of the pivotally mounted abutment 63. This abutment is urged in a counterclockwise direction by the force exerted on it by the end surface 61 of the interrupted flange 60. The abutment 63 ultimately reaches the position indicated in Fig. 4, where its side surface 65 is in contact with one limiting surfaces 66. Accordingly, when the abutment 63 reaches the position of Fig. 4, the ring 58 is restrained from further clockwise movement. Since the end surface 69 of flange 59 contacts the ear 44 of the spring ring clutch member 42, this clutch member 42 is also prevented from further clockwise movement. However, the driving clutch member 36 is free to slip; and this is true because the frictional force exerted on ring 42 by any point of the groove 41 is directed away from the confined ear 44 and toward the free ear 45. Therefore, such a torque, due to this force, tends to compress the ring 42 in the event any substantial friction exists between the two clutching surfaces.

In this way, the transmission mechanism, including the various pinions and planetary gears, can continue to rotate, due to inertia, without imposing a severe strain upon the valve parts.

Thus, the mechanism operates to transmit a high driving torque sufficient to move the load by a positive action through the expanding ring 42. This torque is in excess of the resistance of the load to movement. However, when the limit of movement is reached, the torque is greatly reduced by the compressive effect of the driving member 36 on the ring 42. This reduced torque imposes only minor forces on the load mechanism, well within the strain limits. There is thus no danger of injury to these elements.

Just prior to the time when the clutch member 42 is restrained in this manner, the motor 1 is deenergized. For this purpose, there are provided a pair of circuit controllers, such as microswitches 70 and 71, in chamber 68. These are fastened by the aid of screws 72 to the lower surface 73 (Fig. 6) formed in the motor base member 20. The screws 72 also attach a U-shaped bracket 74 for the accommodation of the connections for the microswitches. These microswitches are provided with the exposed plunger heads 75 and 76 which may be urged inwardly to open the switches and thereby to disconnect the motor 1.

Figure 6:
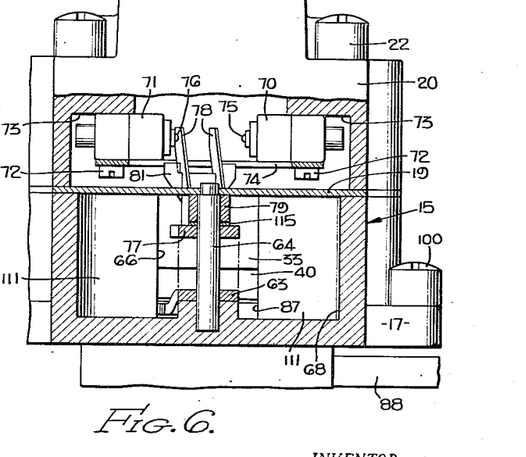
Fig. 6 is a fragmentary vertical sectional view, taken along a plane corresponding to line 6—6 of Fig. 5.

In order to operate the plungers 75 and 76, use is made of a switch actuator mechanism carried by the upper leg 77 of the abutment member 63 (Figs. 3, 5, and 6).

The switch actuator member proper is supported directly on top of leg 77; and it includes a base portion 115 of thin metal, resting directly on leg 77 and held thereto by a rivet 80. A bushing or sleeve 79 is interposed above this portion 115 and the lower surface of wall 19 to restrain the abutment 63 against upward movement.

A pair of parallel flexible arms 78 are integrally formed with base 115. They extend between the microswitches 71 and 72. A resilient cross piece 81 is also formed integrally with base 115. It rises vertically from the edge of base 115 and extends transversely beneath the arms 78. It is provided with a wide slot, the side surfaces of which restrain the arms 70 against separating movement, while yet permitting the arms 78 to approach each other when a transverse force is applied to either of these arms.

As the end surface 61 of the lower flange 60 of ring 58 contacts the upper surface 62 of the abutment 63, the abutment 63 is swung in a counterclockwise direction about the axis of pin 64. This motion causes a corresponding movement of the arms 78, and the lower one of these, as viewed in Fig. 5, actuates switch 71, before the abutment 63 is stopped at surface 66. This arm flexes sufficiently to permit abutment 63 to move into contact with surface 66 (Fig. 4). The force exerted by this arm 78 on switch 71, is, however, sufficient to cause the switch to open.

As soon as the switch 71 is actuated, the motor 1 is deenergized and, in due time, the rotating parts of the transmission mechanism come to rest.

As shown in Fig. 8, the motor 1 is provided with a pair of series windings 82 and 83. A remote circuit controller 84 can be moved in either of two directions to connect either of the two field windings 82 or 83 in series with the armature of motor 1 and one or the other of the microswitches 71, 72. Thus, for example, if the circuit controller 84 is moved to the right, the field winding 82 is energized, and the motor continues to run until the microswitch 71 is actuated as indicated in the position of Fig. 5. As soon as microswitch 71 is actuated, the motor 1 is deenergized, although transmission is permitted to coast.

Should it be desirable to move the valve closure 9 to open position, the motor 1 is operated in the reverse direction. This is effected by moving the circuit controller 84 to the left. Under such circumstances, the field winding 83 is connected in series with the armature 1 and with the microswitch 72.

Under such circumstances, the clutch member 36 is rotated in a counterclockwise direction away from the position indicated in Fig. 4. Thereupon, the end portion 44 of ring 42 contacts the projection 46 and leaves the end surface 69 of the upper flange 59. The load actuator 47 is thus correspondingly moved. At the same time, the end 45 of ring 42 contacts the end surface 85 of flange 59 for urging the ring 58 in a counterclockwise direction. Ultimately, the end surface 86 of lower flange 60 contacts the surface 65 of abutment 63. The abutment 63 is then swung in a clockwise direction to operate microswitch 72 for disconnecting the motor 1. Also, the surface 62 comes into contact with the stopping surface 87 of wall 111 in the casing member 15, and further counterclockwise rotation of ring 42 is prevented. However, continued counterclockwise movement of clutch member 36 is permitted, since and frictional force between the clutch members, due to such movement, now serves to tend to compress the ring 42 as hereinabove described.

In order to indicate the position of the actuator 47, an indicator arm 88 is provided. This indicator arm has cooperating splines formed in the hub 116 of the indicator arm 88, and at an intermediate portion 89 of the shaft 14. Pin 90, passing through this portion 89 of the shaft 14, holds the arm 88 in place. The casing 15 has a depending boss 91 having an arcuate slot 92 through which the arm 89 may project. A spacer washer 93 (Fig. 3) is interposed between the upper surface of the arm 88 and the lower surface of casing 15.

Due to the fact that the direct current motor 1 operates at extremely high speed, the provision of the clutch construction, illustrated most clearly in Figs. 4 and 7, makes it possible to permit the motor to coast to a stopping position after the load has been fully operated. Due to the symmetrical arrangement of the flanges 59 and 60 of the ring 58, this coasting effect is effective for either direction of rotation of the motor 1. The abutment 63 thus serves for either direction of rotation positively to stop the rotation of the ring 42.

In the embodiment illustrated in Figs. 1 to 8, inclusive, it is not practical to use the arm 88 for manually moving the actuator 47 for reversing or otherwise positioning the valve while motor 1 is deenergized. Thus, referring to Fig. 4, direct movement of the actuator 47, by urging arm 88 in a counterclockwise direction, causes engagement of its projection 46 with the ears 44 or 45. As the projection 46 engages whichever ear is in the direction of intended movement, the ring 42 is urged into clutching relationship with the driving flange 40. Therefore, in order to continue to move the actuator, the transmission mechanism must be operated in reverse; but, since the ratio of transmission is very great, it is substantially impossible to so continue to move the actuator 47.

In the form illustrated in Figs. 9 to 13, a mechanism is provided that, first, by manual operation, unclutches the members 42 and 40, and then moves the actuator. The operating projection of the actuating member does not produce a clutching effect. For this purpose, surfaces corresponding to surfaces 85 and 69 are utilized for disengagement of the clutch elements.

A manual operating arm 120 in this instance is directly connected to a stop ring or flanged member 121 rather than to the valve actuator itself. For this purpose, an actuator 122 is provided with an axial bore 123 for mounting a coupling shaft 124. The actuator 122 has a non-circular lower portion 134 for cooperation with the crank 12.

Figures 11, 12, 13:
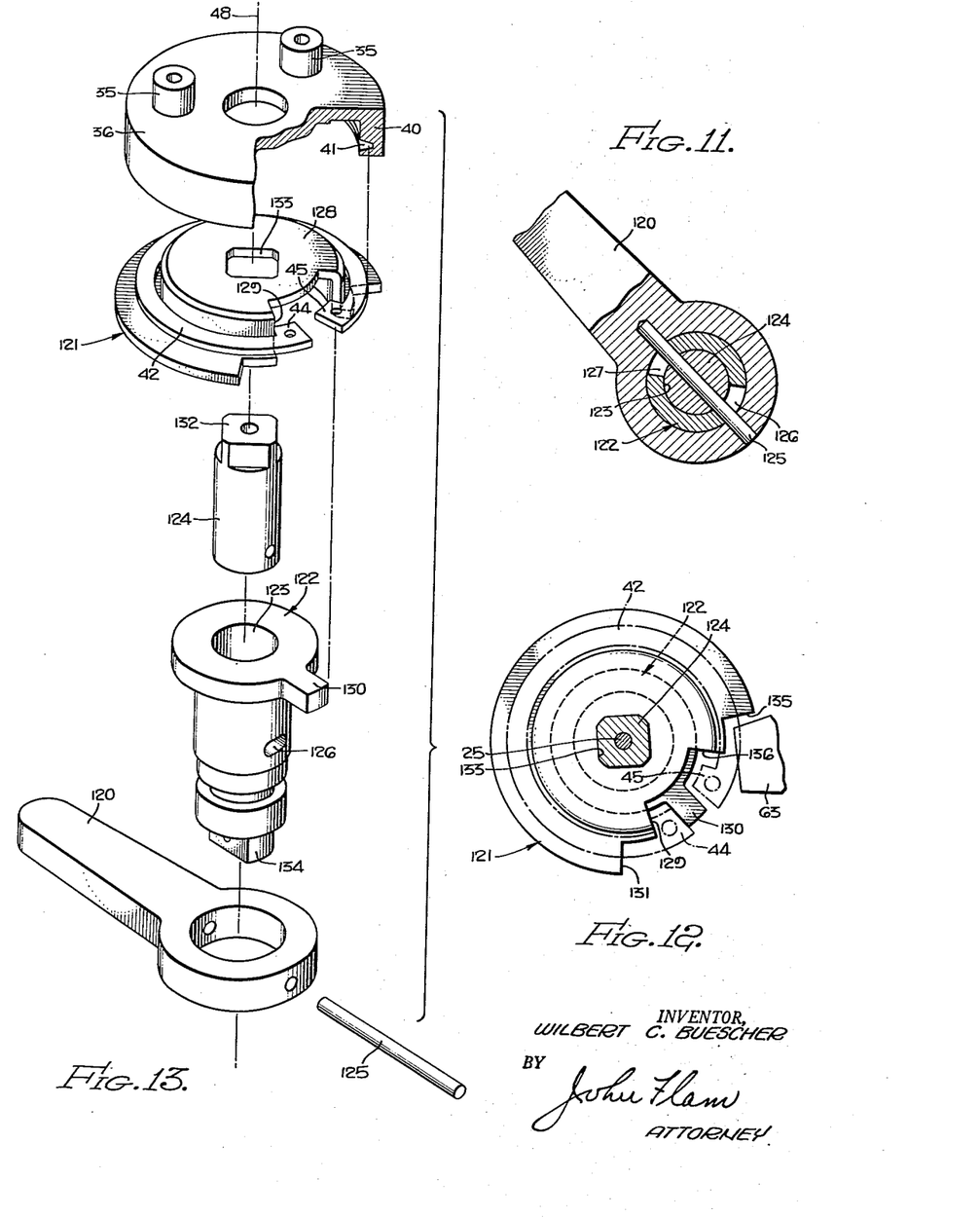
Fig. 11 is a sectional view, taken along a plane corresponding to line 11—11 of Fig. 9.
Fig. 12 is a fragmentary view, similar to Fig. 10, of an alternative position of the apparatus.
Fig. 13 is an exploded pictorial view of the operating parts of the mechanism illustrated in Figs. 9 to 12.

A transverse pin 125 extending through clearance slots 126 and 127 of the actuator 122, as shown most clearly in Fig. 11, connects the coupling shaft 124 to the end boss of arm 120 surrounding the actuator 122. The other end of the shaft 124 is secured to the flanged member or stop ring 121. For this purpose, the flanged member 121 in this instance has a central portion 128 overlying the actuator 124 and provided with a non-circular aperture 133 cooperating with a corresponding non-circular extension 132 of the coupling shaft 124. Accordingly, the arm 120, shaft 124, and flanged member 121 are all secured together for rotation.

Figure 10:
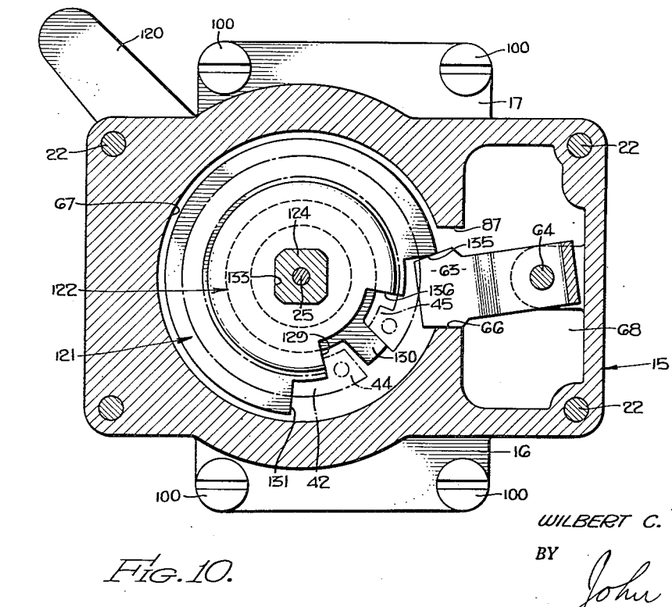
Fig. 10 is a sectional view, taken along a plane corresponding to line 10—10 of Fig. 9.

Fig. 10 illustrates the position of the mechanism after the load has been moved to its limit in a clockwise direction. Reversal of the load is effected by counterclockwise movement of the arm 120. This movement causes a surface 129 of the flanged member 121 to engage the ear 44 of the clutch ring 42 (Fig. 12). The slots 126 and 127 extend arcuately a substantial distance to permit a limited relative movement of the shaft 124, flanged member 121, and arm 120, with respect to the actuator 122. Thus, movement of the flanged member 121 is permitted, and the ear 44 moves into engagement with the operating projection 130 of the actuator 122. Such movement also causes the ear 45 to move away from this operating projection 130. Upon continued counterclockwise movement, the actuator 122 may be moved, since the clutching member 42 now has its trailing ear 45 spaced from the projection 130, whereby it is free to move out of engagement with the flanged driving member 40. The surface 131 of the flanged member 122 will limit the counterclockwise movement of the actuator 121 in a manner similar to that in connection with the motor operation.

Should the actuator 121 be in its counterclockwisemost position, the arm 120 can move the actuator to the clockwisemost position in a manner exactly analogous to that described in connection with counterclockwise movement.

The remaining elements of the motor operated mechanism of the form illustrated in Figs. 9 to 13 are substantially the same as those described in connection with the previous form. Thus, surfaces 135 and 136 of the flanged member 121 cooperate with the abutment 63 and ring 42 for motor operation as before; surfaces 131 and 129 similarly cooperate with the abutment 63 and ring 42.

The shaft 124 in the present instance may conveniently provide the piloting recess for the pin 25 rather than the actuator in the first form.

The circuit controlling members cooperate in the same manner with the abutment 63.

The inventor claims:

1. In a clutch device: a driving member having an internal groove; an interrupted spring ring confined by the groove and forming a driven clutch member; a load operator concentric with the axis of the clutch and having a projection extending between the ends of the ring to be driven by one of said ends; an arcuate member having one end driven by the other end of the ring; and an abutment cooperating with the arcuate member to limit movement of the arcuate member and of the ring.

2. In combination: a driving clutch member; a driven clutch member; said members being normally in frictional driving relation; an operator driven by the driven clutch member; means selectively releasing said driven clutch member in the direction of the drive from the driving clutch member, including an abutment limiting motion of said driven member in the said direction; and means for urging the driven member in the reverse direction for rendering the driving relation ineffective, and independently of the operator.

3. In combination: a driving clutch member having an internal groove; an interrupted spring ring frictionally engaging within the groove and forming a driven clutch member; an operator having a projection entering between the ends of the ring for driving the operator in either direction; means limiting movement of the ring by restraining that end which is out of operative relation to the operator; and means for urging the ring in a reverse direction, and independently of the operator, to cause the said end of the ring to engage the operator.

4. In combination: a driving clutch member; a driven clutch member; said members being normally in frictional driving relation; an operator driven by the driven clutch member; means selectively releasing said driven clutch member in the direction of the drive from the driving clutch member, including an abutment limiting motion of said driven member in the said direction; and means for urging the driven member in the reverse direction, said urging means having a lost motion connection with the operator.

5. In combination: a driving clutch member having an internal groove; an interrupted spring ring frictionally engaging within the groove and forming a driven clutch member; an operator having a projection entering between the ends of the ring for driving the operator in either direction; means limiting movement of the ring by restraining that end which is out of operative relation to the operator; and means for urging the ring in a reverse direction, and independently of the operator, to cause the said end of the ring to engage the operator; said urging means having a lost motion connection with the operator.

6. In combination: a driving clutch member; a driven clutch member; said members being normally in frictional driving relation; means for imparting rotary motion optionally in either direction to the driving clutch member; means selectively releasing said driven clutch member only in the direction of the drive, including an abutment limiting motion of said driven member in the said drive direction; and means operable independently of the driven clutch member, for releasing the driven clutch member in a direction opposite to said drive direction.

7. In combination: a driving clutch member; a driven clutch member; said members being normally in frictional driving relation; means for imparting rotary motion optionally in either direction to the driving clutch member; means selectively releasing said driven clutch member only in the direction of the drive, including an abutment limiting motion of said driven member in the said drive direction; an operator driven by the driven clutch member; and means operable independently of the driven clutch member, for releasing the driven clutch member in a direction opposite to said drive direction.

8. In combination: a driving clutch member having an internal groove; an interrupted spring ring frictionally engaging within the groove and forming a driven clutch member, said ring having angularly spaced ends; means for imparting rotary motion optionally in either direction to the driving clutch member; means selectively releasing said driven clutch member only in the direction of the drive, including an abutment limiting movement of that end of the ring which is spaced from the other end in the driving direction; and means for urging said end of the ring in a reverse direction, independently of the driven member.

9. In combination: a driving clutch member having an internal groove; an interrupted spring ring frictionally engaging within the groove and forming a driven clutch member; said ring having angularly spaced ends; means for imparting rotary motion optionally in either direction to the driving clutch member; means selectively releasing said driven clutch member only in the direction of the drive, including an abutment limiting movement of that end of the ring which is spaced from the other end in the driving direction; an operator having a projection between the ends, and driven by the other of the ends; and means for urging the said end that is spaced in the driving direction in a reverse direction, independently of the operator.

10. In combination: a driving clutch member having an internal groove; an interrupted spring ring frictionally engaging within the groove and forming a driven clutch member; said ring having angularly spaced ends; means for imparting rotary motion optionally in either direction to the driving clutch member; means selectively releasing said driven clutch member only in the direction of the drive, including an abutment limiting movement of that end of the ring which is spaced from the other end in the driving direction; an operator having a projection between the ends, and driven by the other of the ends; and means for urging the said end that is spaced in the driving direction in a reverse direction, independently of the operator; said means including a lost-motion coupling.

11. In combination: a driving clutch member having an internal groove; an interrupted spring ring frictionally engaging within the groove, and having angularly spaced ends; an operator coaxial with the groove and having a projection extending between said ends; means forming an interrupted circular flange, also coaxial with the groove, one end surface of said flange being urged by that end of the ring which is angularly spaced from the other end of the ring in the driving direction; means mounting said flange forming means and telescoping within the operator; and a slot and pin connection between the mounting means and the operator; the pin of said connection extending transversely of the mounting means.

12. In combination: a driving clutch member having an internal groove; an interrupted spring ring frictionally engaging within the groove, and having angularly spaced ends; an operator coaxial with the groove and having a projection extending between said ends; means forming an interrupted circular flange, also coaxial with the groove, one end surface of said flange being urged by that end of the ring which is angularly spaced from the other end of the ring in the driving direction; means mounting said flange forming means and telescoping within the operator; a slot and pin connection between the mounting means and the operator; the pin of said connection extending transversely of the mounting means; and an arm coupled to the mounting means by aid of the pin, said arm having a hub through which the operator extends.

13. In combination: a driving clutch member having an internal groove; an interrupted spring ring frictionally engaging within the groove and forming a driven clutch member; an operator having a projection entering between the ends of the ring for driving the operator in either direction; a stop member driven by that end of the driven ring which is spaced from the other end of the driven ring in the direction of the drive; means limiting movement of the stop member; and means for urging the stop member in a reverse direction, independently of the operator, to cause the said end of the ring to engage the operator.

14. In combination: a driving clutch member having an internal groove; an interrupted spring ring frictionally engaging within the groove and forming a driven clutch member; an operator having a projection entering between the ends of the ring for driving the operator in either direction; a stop member driven by that end of the driven ring which is spaced from the other end of the driven ring in the direction of the drive; means limiting movement of the stop member; and means for urging the stop member in a reverse direction, independently of the operator, to cause the said end of the ring to engage the operator, including a lost motion connection between the operator and the ring, said lost motion being sufficient to bring the said end into engagement with the operator without moving the operator.

15. In combination: a rotatable driving member; an expansible split ring normally peripherally engageable with said driving member for coupling between said ring and said driving member; an actuator having a projection extending between the continuous ends of said split ring, and having clearance with respect thereto; said actuator being movable in one direction upon engagement with one of the ends of said split ring; movable means engageable with the other of the ends of said split ring; means limiting movement of said movable means in said one direction for contracting and uncoupling said split ring from said driving member; power means for moving said driving member in said one direction; and manually operable means for moving said movable means in a direction opposite to said one direction for moving said actuator in said opposite direction and uncoupling said split ring from said driving member.

16. In combination: a rotatable driving member; an expansible split ring normally peripherally engageable with said driving member for coupling between said ring and said driving member; an actuator having a projection extending between the continuous ends of said split ring, and having clearance with respect thereto; said actuator being movable in one direction upon engagement with one of the ends of said split ring; movable means having a first element engageable with the other of the ends of said split ring when said ring is moved in said one direction; said actuator being movable in a direction opposite to said one direction upon engagement with the other of the ends of said split ring; said movable means also having a second element engageable with the said one of said ends of said split ring when said ring is moved in said opposite direction; means limiting movement of said movable member in both said directions and defining limits of movement of said movable member, said limiting means when operative being effective to cause contraction of said ring for uncoupling of said ring from said driving member; and manually operable means for moving said movable means to cause engagement of either of said ends of said ring with said actuator for movement of said actuator and for uncoupling of said ring from said driving member upon the existence of restraint on said driving member.

17. In combination: a rotatable driving member; an expansible split ring normally peripherally engageable with said driving member for coupling between said ring and said driving member; an actuator having a projection extending between the continuous ends of said split ring, and having clearance with respect thereto; said actuator being movable in one direction upon engagement with one of the ends of said split ring; movable means having a first element engageable with the other of the ends of said split ring when said ring is moved in said one direction; said actuator being movable in a direction opposite to said one direction upon engagement with the other of the ends of said split ring; said movable means also having a second element engageable with the said one of said ends of said split ring when said ring is moved in said opposite direction; means limiting movement of said movable member in both said directions and defining limits of movement of said movable member, said limiting means when operative being effective to cause contraction of said ring for uncoupling of said ring from said driving member; manually operable means for moving said movable means to cause engagement of either of said ends of said ring with said actuator for movement of said actuator and for uncoupling of said ring from said driving member upon the existence of restraint on said driving member; reversible power means for moving said driving member; and means operated by said movable member before arrival of said movable member to either limiting position to deenergize said power means.

18. In a device of the character described: a clutch having rotary driving and driven clutch members, the driven clutch member being arcuate and having provisions for resiliently engaging the other clutch member along an arc concentric with the axis of rotation, and along an arc exceeding a semicircle; an arcuate force transmitting means engaging the trailing end of said arcuate member; and means stopping the movement of said force transmitting means upon a definite angular movement of the driven clutch member.

19. In a device of the character described: an electric motor; a clutch having rotary driving and driven clutch members, the driven clutch member being arcuate and having provisions for resiliently engaging the other clutch member along an arc exceeding a semicircle; means coupling the driving member to the motor; an arcuate force transmitting means engaging the trailing end of said arcuate clutch member; a movable abutment engageable by said force transmitting means; means limiting the movement of the abutment; and a circuit controller operated by movement of the abutment when engaged by said force transmitting means for deenergizing said motor.

20. In a device of the character described: a driving clutch member having an internal circular friction surface; an arcuate interrupted spring ring resiliently engaging said surface and forming a driven clutch member; an arcuate force transmitting means engaging the trailing end of said ring and angularly urged by said ring in the direction of motion; and means stopping the movement of said force transmitting means upon a definite angular movement of the spring ring.

21. In a device of the character described: an electric motor; a driving clutch member having an internal circular friction surface; means coupling the motor to said driving clutch member; an arcuate interrupted spring ring resiliently engaging said surface and forming a driven clutch member; an arcuate force transmitting means engaging the trailing end of said ring and angularly urged by said ring in the direction of motion; a movable abutment engageable by said force transmitting means; means limiting the movement of the abutment; and a circuit controller operated by movement of the abutment when engaged by said force transmitting means, for deenergizing said motor.

22. In a device of the character described: load driving means including a member having a circular surface; an arcuate frictional gripping means resiliently engaging said surface and extending along an arc exceeding a semicircle; a first angularly movable abutment member in the path of movement of said gripping means; a second movable abutment member; means limiting the movement of said second abutment member; and means forming a lost motion connection between said abutment members; said abutment members when operative restraining said gripping means for releasing said gripping means from said load driving means.

References Cited in the file of this patent

UNITED STATES PATENTS

| | | |
|---|---|---|
| 1,912,407 | Sahli | June 6, 1933 |
| 2,050,613 | Kellogg | Aug. 11, 1936 |
| 2,397,861 | Hoover | Apr. 2, 1946 |
| 2,547,475 | Larsen | Apr. 3, 1951 |
| 2,621,543 | Rossmann | Dec. 16, 1952 |